(12) United States Patent
Thomsen et al.

(10) Patent No.: US 10,895,247 B2
(45) Date of Patent: Jan. 19, 2021

(54) WIND TURBINE NACELLE COMPRISING A REAR FRAME STRUCTURE WITH FLEXIBLE JOINTS

(71) Applicant: Vestas Wind Systems A/S, Aarhus N. (DK)

(72) Inventors: Kristoffer Isbak Thomsen, Århus N (DK); Anders Haslund Liingaard, Hinnerup (DK)

(73) Assignee: Vestas Wind Systems A/S, Aarhus N. (DK)

( * ) Notice: Subject to any disclaimer, the term of this patent is extended or adjusted under 35 U.S.C. 154(b) by 260 days.

(21) Appl. No.: 16/089,069

(22) PCT Filed: Mar. 9, 2017

(86) PCT No.: PCT/DK2017/050068
§ 371 (c)(1),
(2) Date: Sep. 27, 2018

(87) PCT Pub. No.: WO2017/220095
PCT Pub. Date: Dec. 28, 2017

(65) Prior Publication Data
US 2020/0300222 A1 Sep. 24, 2020

(30) Foreign Application Priority Data
Jun. 22, 2016 (DK) .......................... PA 2016 70449

(51) Int. Cl.
*F03D 13/20* (2016.01)
(52) U.S. Cl.
CPC .......... *F03D 13/20* (2016.05); *F05B 2240/14* (2013.01)
(58) Field of Classification Search
CPC ...... F03D 13/20; F03D 80/50; F05B 2240/14; Y02E 10/728; Y02E 10/72
(Continued)

(56) References Cited

U.S. PATENT DOCUMENTS 4,366,386 A * 12/1982 Hanson ................. F03D 1/0616
290/44
4,735,552 A * 4/1988 Watson .................... F03D 13/20
416/99
(Continued)

FOREIGN PATENT DOCUMENTS

CN 102996368 A 3/2013
EP 2143945 A2 1/2010
(Continued)

OTHER PUBLICATIONS

Danish Patent and Trademark Office, Search Report in PA 2016 70449, dated Jan. 10, 2017.
(Continued)

*Primary Examiner* — Charles Reid, Jr.
(74) *Attorney, Agent, or Firm* — Wood Herron & Evans LLP

(57) ABSTRACT

A nacelle of a wind turbine includes a rear frame structure (1), the rear frame structure (1) having a plurality of truss members (2), and a plurality of joints (3), each joint (3) interconnecting ends of at least two truss members (2). Each joint (3) includes a central portion (6) and at least two connecting portions (7) extending away from the central portion (6), each connecting portion (7) being arranged to form an interface towards a truss member (2), and each connecting portion (7) being significantly more flexible than the central portion (6) and significantly more flexible than the truss members (2). The rear frame structure (1) is capable of improved handling of bending moments due to the increased flexibility of the connecting portions (7).

10 Claims, 2 Drawing Sheets

(58) Field of Classification Search
USPC ........................................................ 52/745.17
See application file for complete search history.

(56) References Cited

U.S. PATENT DOCUMENTS

| | | | |
|---|---|---|---|
| 2009/0249707 A1* | 10/2009 | Curme | F03D 13/10 52/40 |
| 2011/0243726 A1 | 10/2011 | Wohlleb | |
| 2013/0195653 A1 | 8/2013 | Hayashi et al. | |
| 2015/0101645 A1 | 4/2015 | Neville et al. | |

FOREIGN PATENT DOCUMENTS

| | | |
|---|---|---|
| EP | 2184489 A2 | 5/2010 |
| EP | 2317137 A1 | 5/2011 |
| EP | 2322795 A2 | 5/2011 |
| EP | 2899394 A1 | 7/2015 |
| WO | 2010069315 A2 | 6/2010 |
| WO | 2011051272 A2 | 5/2011 |
| WO | 2015149808 A1 | 10/2015 |

OTHER PUBLICATIONS

European Patent Office, International Search Report and Written Opinion in PCT Application No. PCT/DK2017/050068, dated Jun. 20, 2017.

China National Intellectual Property Administration, First Notification of Office Action in CN Application No. 201780033753, dated Aug. 28, 2019.

\* cited by examiner

WIND TURBINE NACELLE COMPRISING A REAR FRAME STRUCTURE WITH FLEXIBLE JOINTS

FIELD OF THE INVENTION

The present invention relates to a nacelle of a wind turbine, comprising a rear frame structure being capable of improved handling of bending moment in the rear frame structure.

BACKGROUND OF THE INVENTION

Wind turbines normally comprise a nacelle arranged on top of a tower structure. The nacelle carries a rotor with one or more wind turbine blades, and various components, such as gear arrangement, generator, etc., are normally housed inside the nacelle.

Nacelles often comprise a main frame, a rear frame structure and a nacelle cover. The main frame is a load carrying structure arranged to be connected to the tower structure via a yaw mechanism, allowing the nacelle to perform rotating movements with respect to the tower structure in order to direct the wind turbine blades towards the incoming wind. The rear frame structure also exhibits load carrying capabilities, e.g. for carrying some of the components being housed inside the nacelle, and is connected at one end to the main frame. The nacelle cover forms an outer boundary of the nacelle and provides protection against the environment for the components arranged inside the nacelle. The nacelle cover will often not exhibit load carrying capabilities.

In prior art nacelles, the rear frame structure often comprises a number of truss members, e.g. in the form of beams, rods or the like, being connected to each other in order to form the rear frame structure. The connections between the truss members are normally of a relatively rigid or fixed kind, such as welding connections or bolt connections. In order for such rigid rear frame structures to be capable of handling bending moments in the rear frame structure, it is necessary to use truss members with a strength, and thereby a material thickness, which is sufficient to handle expected bending moments. This adds to the weight of the nacelle as well as to the costs of manufacturing the nacelle.

WO 2010/069315 A2 discloses a wind turbine nacelle comprising wind turbine components. The nacelle also comprises a load carrying structure including a base member establishing a connection between the wind turbine rotor and tower, at least one tie member, and at least one strut member carrying one or more of the wind turbine components. The tie and strut members are connected at one end to each other and at the opposite end to different positions on the base member for establishing one or more closed structures.

DESCRIPTION OF THE INVENTION

It is an object of embodiments of the invention to provide a nacelle of a wind turbine comprising a rear frame structure being capable of improved handling of bending moments as compared to prior art rear frame structures.

It is a further object of embodiments of the invention to provide a nacelle of a wind turbine, comprising a rear frame structure, in which the material thickness of the rear frame structure is reduced while maintaining the capability of handling bending moments.

According to a first aspect the invention provides a nacelle of a wind turbine, the nacelle comprising a rear frame structure, the rear frame structure comprising:
 a plurality of truss members, and
 a plurality of joints,
wherein each joint interconnects ends of at least two truss members, and wherein each joint comprises a central portion and at least two connecting portions extending away from the central portion, each connecting portion being arranged to form an interface towards a truss member, and each connecting portion being significantly more flexible than the central portion and significantly more flexible than the truss members.

Thus, according to the first aspect, the invention provides a nacelle comprising a rear frame structure. As described above, in the present context the term 'rear frame structure' should be interpreted to mean a load carrying structure of the nacelle, which is not directly connected to the tower structure of the wind turbine.

The rear frame structure comprises a plurality of truss members and a plurality of joints. In the present context the term 'truss member' should be interpreted to mean an elongated and relatively rigid member being suitable for forming part of a truss structure, and which is arranged to provide load carrying capability to the rear frame structure. The truss members could, e.g., be in the form of rods, beams or the like.

Each joint interconnects ends of at least two truss members. Accordingly, the truss members of the rear frame structure are connected to each other via the joints, and a truss structure may thereby be formed with the joints arranged in the node points of the truss structure, the node points being interconnected by truss members.

Each joint comprises a central portion and at least two connecting portions extending away from the central portion. Each connecting portion is arranged to form an interface towards a truss member. Accordingly, the truss members are connected to the joints via the connecting portions.

Each connecting portion is significantly more flexible than the central portion of the corresponding joint, and significantly more flexible than the truss members. Thereby the connecting portions of the joints constitute the most flexible parts of the rear frame structure formed by the truss members and the joints. This allows the connecting portions of the joints to take up rotational deflections introduced in the rear frame structure, and bending moments are therefore not introduced in the truss members, or are only introduced to a limited extent. Accordingly, only compression and tensile forces need to be handled by the truss members.

In the present context the term 'significantly more flexible' should be interpreted to mean that the connecting portions are more inclined to flex, when being subjected to a given force, than the central portion or the truss members, to an extent which provides a measurable technical effect.

Thus, the nacelle according to the first aspect of the invention is capable of improved handling of bending moments as compared to prior art nacelles, and this is obtained without requiring increased material thickness of the rear frame structure.

The increased flexibility of the connecting portions may be with respect to bending of the connecting portions relative to the central portion and relative to the truss members connected thereto, while such increased flexibility may not be provided with respect to compression of the connecting portions along a direction towards or away from the central portion.

The connecting portions of at least one joint may be in the form of laminate structures. In the present context the term 'laminate structure' should be interpreted to mean a structure which comprises two or more layers of material arranged sequentially, one on top of the other. The individual layers of the laminate structure may be able to shift slightly relative to each other.

According to this embodiment, the laminate structures provide the required flexibility of the connecting portions. The increased flexibility of the connecting portions in this case allows the connecting portions to bend relative to the central portion and relative to the truss members connected thereto, along a direction which is substantially perpendicular to the layers of the laminate structures.

The laminate structures may be made from the same material as the central portion of the joint, and at least some of the layers of the laminate structures may form an integral part of the central portion.

As an alternative to the laminate structure of the connecting portions, the increased flexibility of the connecting portions may be provided in any other suitable manner. For instance, the connecting portions may be made from a different material than the material of the central portion, the material properties of the connecting portions providing the required increased flexibility. Alternatively or additionally, the material thickness of the connecting portions may be decreased as compared to the material thickness of the central portion.

The connecting portions may have a bending stiffness which is at most 80% of the bending stiffness of the central portion. In the present context the term 'bending stiffness' should be interpreted to mean the resistance of an element against bending deformation with respect to a given axis of interest. According to this embodiment, since the bending stiffness of the connecting portions is lower than the bending stiffness of the central portion, the connecting portions will have less resistance against bending deformation than the central portion. Accordingly, when the joint is subjected to bending moments with respect to the axis of interest, the connecting portions are likely to bend, while the central portion remains in a non-deformed state.

Thus, according to this embodiment, the significantly higher flexibility of the connecting portions relative to the central portion and to the truss members is provided by the lower bending stiffness of the connecting portions.

The bending stiffness of the connecting portions may be between 10% and 80% of the bending stiffness of the central portion, such as between 15% and 75%, such as between 20% and 70%, such as between 30% and 60%, such as approximately 40% or approximately 50%.

At least one of the truss members may be pre-stressed. Thereby the rear frame structure is very stable.

The rear frame structure may define one or more triangles, the sides of the triangle(s) being formed by truss members, and the vertices of the triangle(s) being formed by joints. A structure, e.g. a truss structure, defining triangles is normally a very stable structure. In the case that all of the truss members are of substantially identical length, the triangles defined by the rear frame structure are equilateral triangles, i.e. all of the sides of the triangle are of the same length. As an alternative, at least some of the triangles may be isosceles triangles, i.e. two of the sides of the triangle are of the same length, and the length of the third side differs from the length of the other two.

At least one of the joints may be provided with means for attaching a nacelle cover to the rear frame structure. According to this embodiment, the nacelle cover is mounted on the rear frame structure via the joints, and thereby via the node points of the truss structure defined by the truss members and the joints. This is an advantage because it is desirable to handle loads in the rear frame structure at the node points. The means for attaching the nacelle cover to the rear frame structure may be resilient. This may, e.g., be obtained by forming at least a part of the attaching means from a resilient material, such as rubber. Thereby vibrations or various moments introduced in the rear frame structure and/or in the nacelle cover are removed or dampened instead of being transferred to the nacelle cover or rear frame structure, respectively. This reduces noise during operation of the wind turbine, as well as wear on the nacelle.

The rear frame structure may be connectable to a base frame of a wind turbine. For instance, one or more of the truss members may have one end connected to the base frame and an opposite end connected to a connecting portion of a joint.

Thus, the nacelle may further comprise a base frame arranged to be connected to a tower structure and a nacelle cover attached to the rear frame structure.

According to a second aspect the invention provides a joint for use in a nacelle of a wind turbine according to the first aspect of the invention, the joint comprising a central portion and at least two connecting portions extending away from the central portion, each connecting portion being significantly more flexible than the central portion. This has already been described in detail above.

According to a third aspect, the invention provides a wind turbine comprising a nacelle according to the first aspect of the invention. Accordingly, the remarks set forth above with reference to the first aspect of the invention are equally applicable here.

BRIEF DESCRIPTION OF THE DRAWINGS

The invention will now be described in further detail with reference to the accompanying drawings in which.

DETAILED DESCRIPTION OF THE DRAWINGS

Figure 1:
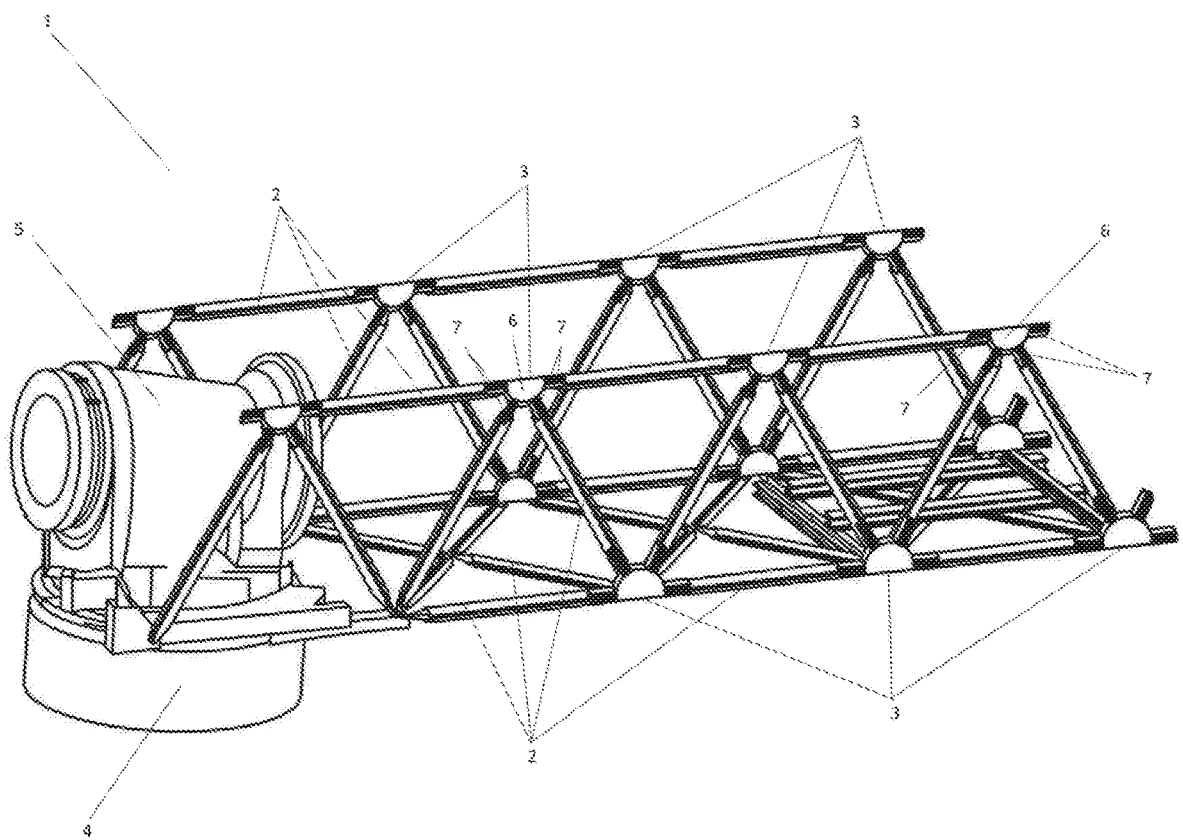
FIG. 1 is a perspective view of a rear frame structure for a nacelle according to an embodiment of the invention.

FIG. 1 is a perspective view of a rear frame structure 1 for a nacelle according to an embodiment of the invention. The rear frame structure comprises a plurality of truss members 2, being interconnected via a plurality of joints 3, thereby forming a truss structure with the joints 3 arranged in the node points of the truss structure. The rear frame structure 1 defines a plurality of triangles, with truss members 2 forming the sides of the triangles and joints 3 forming the vertices of the triangles.

It is noted that, even though the rear frame structure 1 illustrated in FIG. 1 defines a number of triangles, it is not ruled out that the truss members 2 and joints 3 could be arranged according to other configurations, and such configurations also form part of the present invention. Furthermore, rear frame structures 1 comprising more or fewer truss members 2 and/or joints 3 than what is shown in FIG. 1 also fall within the scope of the present invention.

The rear frame structure 1 is connected to a base frame 4 of the nacelle, the base frame 4 carrying a main bearing 5.

Each of the joints 3 comprises a central portion 6 and a number of connecting portions 7. The connecting portions 7 extend away from the central portion 6, and each connecting portion 7 is connected to an end of a truss member 2. Accordingly, the truss members 2 are connected to the joints 3 via the connecting portions 7.

The connecting portions 7 are significantly more flexible than the central portions 6 and significantly more flexible than the truss members 2. For instance, the connecting portions 7 may have a bending stiffness which is significantly lower than the bending stiffness of the central portions 6 and significantly lower than the bending stiffness of the truss members 2.

Thereby, when bending moments are introduced in the rear frame structure 1, the connecting portions 7 take up the bending moments. Accordingly, bending moments are not introduced in the truss members 2, or are only introduced in the truss members 2 to a limited extent. Thereby, only compression and tensile forces need to be handled by the truss members 2.

Figure 2:
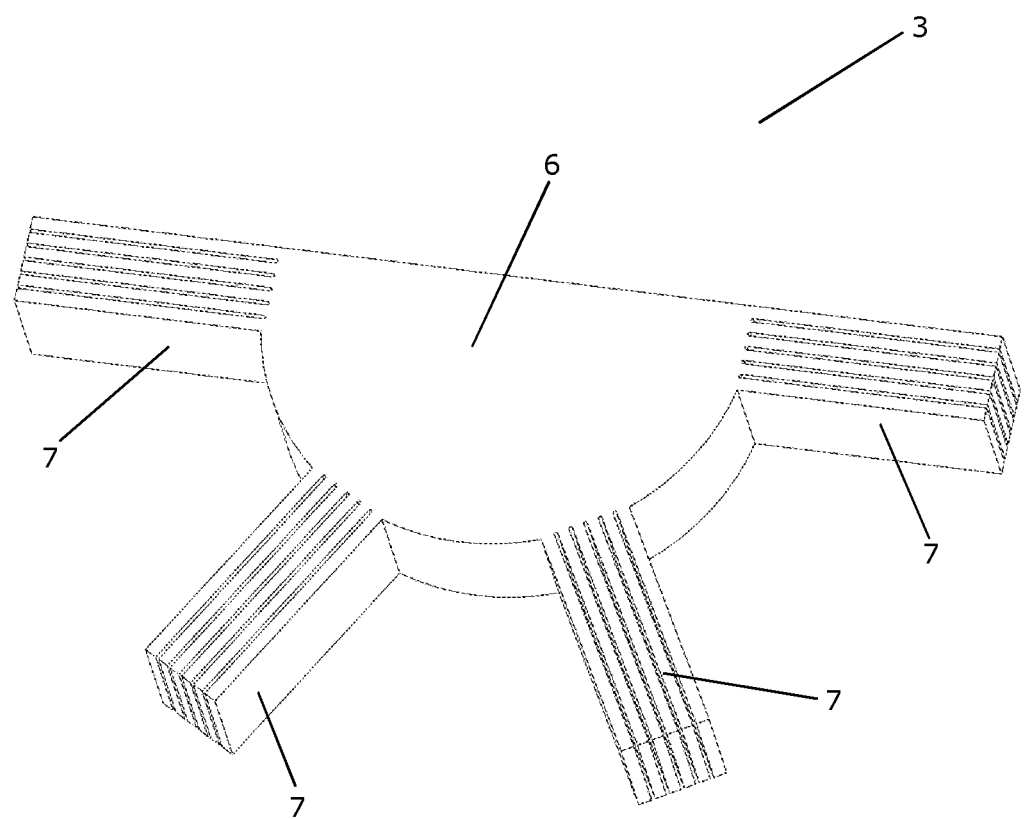
FIG. 2 is a perspective view of a joint according to an embodiment of the invention.

FIG. 2 is a perspective view of a joint 3 according to an embodiment of the invention. The joint 3 of FIG. 2 could, e.g., be used in the rear frame structure 1 of FIG. 1.

The joint 3 comprises a central portion 6 and four connecting portions 7. Each of the connecting portions 7 may be connected to a truss member when the joint 3 forms part of a rear frame structure. However, in some cases only some of the connecting portions 7 will be connected to a truss member. It is noted that, even though the joint 3 illustrated in FIG. 2 comprises four connecting portions 7, it is not ruled out that the joint 3 could comprises fewer or more connecting portions 7, and such joints 3 should also be regarded as falling within the scope of protection of the present invention.

The connecting portions 7 illustrated in FIG. 2 have a laminate structure, in the sense that each connecting portion 7 comprises six separate layers of material arranged adjacent to each other in such a manner that neighbouring layers can move slightly relative to each other. The laminate structure provides increased flexibility to the connecting portions 7, as compared to the central portion 6, in the sense that the bending stiffness of the connecting portions 7 is lower than the bending stiffness of the central portion 6, with respect to an axis extending parallel to the layers of the laminate structure. This increased flexibility of the connecting portions 7 allows the connecting portions 7 to take up bending moments introduced in a rear frame structure in which the joint 3 is arranged. Thereby the rear frame structure is capable of improved handling of bending moments.

It should be noted that it is within the scope of protection of the present invention that the connecting portions 7 of the joint 3 could be provided with increased flexibility as compares to the central portion 6 in other ways than by means of a laminate structure. For instance, the connecting portions 7 could have a decreased thickness and/or they could be made from a different material than the central portion 6.

The invention claimed is:

1. A nacelle of a wind turbine, the nacelle comprising a rear frame structure, the rear frame structure comprising:
   a plurality of truss members, and
   a plurality of joints,
   wherein each of the plurality of joints interconnects ends of at least two of the plurality of truss members, and wherein each of the plurality of joints comprises a central portion and at least two connecting portions extending away from the central portion, each of the at least two connecting portions being arranged to form an interface towards a respective one of the at least two of the plurality of truss members, and each of the at least two connecting portions being significantly more flexible than the central portion and significantly more flexible than the plurality of truss members.

2. The nacelle according to claim 1, wherein the at least two connecting portions of at least one of the plurality of joints are in the form of laminate structures.

3. The nacelle according to claim 1, wherein the at least two connecting portions have a bending stiffness which is at most 80% of the bending stiffness of the central portion.

4. The nacelle according to claim 1, wherein at least one of the plurality of truss members is pre-stressed.

5. The nacelle according to claim 1, wherein the rear frame structure defines one or more triangles, the sides of the one or more triangles being formed by the plurality of truss members, and the vertices of the one or more triangles being formed by the plurality of joints.

6. The nacelle according to claim 1, wherein at least one of the plurality of joints is provided with means for attaching a nacelle cover to the rear frame structure.

7. The nacelle according to claim 1, wherein the rear frame structure is connectable to a base frame of a wind turbine.

8. The nacelle according to claim 1, the nacelle further comprising a base frame arranged to be connected to a tower structure and a nacelle cover attached to the rear frame structure.

9. A joint for use in a nacelle of a wind turbine, the nacelle including a rear frame structure having a plurality of truss members, wherein the joint interconnects ends of at least two of the plurality of truss members, the joint comprising a central portion and at least two connecting portions extending away from the central portion, each of the at least two connecting portions being significantly more flexible than the central portion.

10. A wind turbine comprising a nacelle having a rear frame structure, the rear frame structure comprising:
   a plurality of truss members, and
   a plurality of joints,
   wherein each of the plurality of joints interconnects ends of at least two of the plurality of truss members, and wherein each of the plurality of joints comprises a central portion and at least two connecting portions extending away from the central portion, each of the at least two connecting portions being arranged to form an interface towards a respective one of the at least two of the plurality of truss members, and each of the at least two connecting portions being significantly more flexible than the central portion and significantly more flexible than the plurality of truss members.

* * * * *